United States Patent
Ringe et al.

(10) Patent No.: US 10,042,766 B1
(45) Date of Patent: Aug. 7, 2018

(54) DATA PROCESSING APPARATUS WITH SNOOP REQUEST ADDRESS ALIGNMENT AND SNOOP RESPONSE TIME ALIGNMENT

(71) Applicant: ARM Limited, Cambridge (GB)

(72) Inventors: Tushar P. Ringe, Austin, TX (US); Jamshed Jalal, Austin, TX (US); Klas Magnus Bruce, Leander, TX (US); Phanindra Kumar Mannava, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/422,691

(22) Filed: Feb. 2, 2017

(51) Int. Cl.
*G06F 13/00* (2006.01)
*G06F 12/0831* (2016.01)
*G06F 15/78* (2006.01)
*G06F 12/0868* (2016.01)
*G06F 13/42* (2006.01)
*G06F 13/16* (2006.01)
*G06F 12/06* (2006.01)
*G06F 13/38* (2006.01)

(52) U.S. Cl.
CPC ...... *G06F 12/0831* (2013.01); *G06F 15/7807* (2013.01); *G06F 12/063* (2013.01); *G06F 12/0868* (2013.01); *G06F 13/1678* (2013.01); *G06F 13/1684* (2013.01); *G06F 13/387* (2013.01); *G06F 13/4256* (2013.01); *G06F 13/4273* (2013.01); *G06F 13/4291* (2013.01); *G06F 2212/621* (2013.01)

(58) Field of Classification Search
CPC ............... G06F 12/0831; G06F 12/063; G06F 12/0868; G06F 15/7807; G06F 2212/621; G06F 13/1678; G06F 13/1684; G06F 13/4256; G06F 13/4273; G06F 13/4291; G06F 13/387
USPC .... 711/118, 146, 154, 156, 158; 710/36, 52, 710/56, 60, 66, 107, 307
See application file for complete search history.

(56) References Cited

U.S. PATENT DOCUMENTS

| | | | |
|---|---|---|---|
| 5,966,729 A | 10/1999 | Phelps | |
| 6,128,707 A * | 10/2000 | Arimilli | G06F 12/0804 710/35 |
| 6,298,424 B1 * | 10/2001 | Lewchuk | G06F 13/18 711/137 |
| 6,519,685 B1 | 2/2003 | Chang | |
| 6,546,447 B1 | 4/2003 | Buckland et al. | |

(Continued)

OTHER PUBLICATIONS

A. Moshovos, G. Memik, B. Falsafi and A. Choudhary, "JETTY: filtering snoops for reduced energy consumption in SMP servers," Proceedings HPCA Seventh International Symposium on High-Performance Computer Architecture, Monterrey, 2001, pp. 85-96.

*Primary Examiner* — Reba I Elmore
(74) *Attorney, Agent, or Firm* — Leveque IP Law, P.C.

(57) ABSTRACT

A home node of a data processing apparatus that includes a number of devices coupled via an interconnect system is configured to provide efficient transfer of data to a first device from a second device. The home node is configured dependent upon data bus widths of the first and second devices and the data bus width of the interconnect system. Data is transferred as a cache line serialized into a number of data beats. The home node may be configured to minimize the number of data transfers on the third data bus or to minimize latency in the transfer of the critical beat of the cache line.

26 Claims, 6 Drawing Sheets

(56) References Cited

U.S. PATENT DOCUMENTS

| | | |
|---|---|---|
| 6,598,123 B1 | 7/2003 | Anderson |
| 6,799,252 B1 | 9/2004 | Bauman |
| 6,810,467 B1 | 10/2004 | Khare |
| 6,868,481 B1 | 3/2005 | Gaither |
| 7,117,311 B1 | 10/2006 | Rankin |
| 7,117,312 B1 | 10/2006 | Cypher |
| 7,240,165 B2 | 7/2007 | Tierney |
| 7,325,102 B1 | 1/2008 | Cypher |
| 7,613,882 B1 | 11/2009 | Akkawi |
| 7,685,409 B2 | 3/2010 | Du |
| 7,698,509 B1 | 4/2010 | Koster |
| 7,836,144 B2 | 11/2010 | Mannava |
| 7,925,840 B2 | 4/2011 | Harris et al. |
| 7,937,535 B2 | 5/2011 | Ozer |
| 8,392,665 B2 | 3/2013 | Moga et al. |
| 8,423,736 B2 | 4/2013 | Blake |
| 8,638,789 B1 | 1/2014 | Pani |
| 8,935,485 B2 | 1/2015 | Jalal |
| 9,058,272 B1 | 6/2015 | O'Bleness et al. |
| 9,166,936 B1 | 10/2015 | Stovall |
| 9,507,716 B2 | 11/2016 | Salisbury |
| 9,575,893 B2 | 2/2017 | Lin et al. |
| 9,639,469 B2 | 5/2017 | Moll et al. |
| 9,652,404 B2 | 5/2017 | Pierson et al. |
| 9,727,466 B2 | 8/2017 | Tune et al. |
| 9,767,026 B2 | 9/2017 | Niell et al. |
| 9,817,760 B2 | 11/2017 | Robinson et al. |
| 9,830,265 B2 | 11/2017 | Rowlands et al. |
| 9,830,294 B2 | 11/2017 | Mathewson et al. |
| 9,870,209 B2 | 1/2018 | Kelm et al. |
| 2002/0087811 A1 | 7/2002 | Khare et al. |
| 2002/0147889 A1 | 10/2002 | Kruckemyer et al. |
| 2002/0184460 A1* | 12/2002 | Tremblay ............ G06F 9/30043 711/167 |
| 2003/0028819 A1 | 2/2003 | Chiu |
| 2003/0070016 A1 | 4/2003 | Jones et al. |
| 2003/0105933 A1* | 6/2003 | Keskar ............... G06F 13/1694 711/167 |
| 2003/0115385 A1* | 6/2003 | Adamane ......... G01R 31/31715 710/22 |
| 2003/0131202 A1 | 7/2003 | Khare |
| 2003/0140200 A1 | 7/2003 | Jamil et al. |
| 2003/0163649 A1 | 8/2003 | Kapur |
| 2003/0167367 A1 | 9/2003 | Kaushik |
| 2004/0003184 A1 | 1/2004 | Safranek |
| 2004/0117561 A1 | 6/2004 | Quach |
| 2004/0193809 A1 | 9/2004 | Dieffenderfer et al. |
| 2005/0005073 A1 | 1/2005 | Pruvost et al. |
| 2005/0160430 A1 | 7/2005 | Steely, Jr. et al. |
| 2005/0201383 A1 | 9/2005 | Bhandari et al. |
| 2006/0080508 A1 | 4/2006 | Hoover et al. |
| 2006/0080512 A1 | 4/2006 | Hoover et al. |
| 2006/0136680 A1* | 6/2006 | Borkenhagen ........ G06F 9/5061 711/154 |
| 2006/0224835 A1 | 10/2006 | Blumrich et al. |
| 2006/0224836 A1 | 10/2006 | Blumrich et al. |
| 2006/0224838 A1 | 10/2006 | Blumrich |
| 2006/0224840 A1 | 10/2006 | Blumrich et al. |
| 2007/0005899 A1 | 1/2007 | Sistla |
| 2007/0073879 A1 | 3/2007 | Tsien |
| 2007/0079044 A1 | 4/2007 | Mandal et al. |
| 2007/0186054 A1 | 8/2007 | Kruckemyer |
| 2007/0239941 A1 | 11/2007 | Looi |
| 2008/0005485 A1 | 1/2008 | Gilbert |
| 2008/0005486 A1 | 1/2008 | Mannava et al. |
| 2008/0120466 A1* | 5/2008 | Oberlaender ....... G06F 12/0846 711/123 |
| 2008/0209133 A1 | 8/2008 | Ozer et al. |
| 2008/0243739 A1 | 10/2008 | Tsien |
| 2008/0244193 A1 | 10/2008 | Sistla et al. |
| 2008/0320232 A1 | 12/2008 | Vishin et al. |
| 2008/0320233 A1 | 12/2008 | Kinter |
| 2009/0158022 A1 | 6/2009 | Radhakrishnan et al. |
| 2009/0300289 A1 | 12/2009 | Kurts |
| 2011/0179226 A1 | 7/2011 | Takata |
| 2012/0099475 A1 | 4/2012 | Tokuoka |
| 2012/0144064 A1 | 6/2012 | Parker |
| 2012/0198156 A1* | 8/2012 | Moyer .................... G06F 12/06 711/118 |
| 2013/0042070 A1 | 2/2013 | Jalal et al. |
| 2013/0042078 A1 | 2/2013 | Jalal et al. |
| 2013/0051391 A1 | 2/2013 | Jayasimha |
| 2014/0032853 A1 | 1/2014 | Lih |
| 2014/0052905 A1 | 2/2014 | Lih et al. |
| 2014/0082297 A1 | 3/2014 | Solihin |
| 2014/0095801 A1 | 4/2014 | Bodas et al. |
| 2014/0095806 A1 | 4/2014 | Fajardo |
| 2014/0095808 A1 | 4/2014 | Moll et al. |
| 2014/0181394 A1 | 6/2014 | Hum et al. |
| 2014/0189239 A1 | 7/2014 | Hum |
| 2014/0223104 A1 | 8/2014 | Solihin |
| 2014/0281180 A1 | 9/2014 | Tune |
| 2014/0317357 A1* | 10/2014 | Kaplan ............... G06F 12/0802 711/137 |
| 2014/0372696 A1 | 12/2014 | Tune et al. |
| 2015/0074357 A1 | 3/2015 | McDonald et al. |
| 2015/0095544 A1 | 4/2015 | Debendra |
| 2015/0103822 A1 | 4/2015 | Gianchandani |
| 2015/0127907 A1 | 5/2015 | Fahim et al. |
| 2015/0286577 A1 | 10/2015 | Solihin |
| 2015/0324288 A1 | 11/2015 | Rowlands |
| 2016/0041936 A1 | 2/2016 | Lee et al. |
| 2016/0055085 A1 | 2/2016 | Salisbury et al. |
| 2016/0062889 A1 | 3/2016 | Salisbury |
| 2016/0062890 A1 | 3/2016 | Salisbury |
| 2016/0062893 A1 | 3/2016 | Tune |
| 2016/0117249 A1 | 4/2016 | Lin et al. |
| 2016/0147661 A1 | 5/2016 | Ambroladze |
| 2016/0147662 A1 | 5/2016 | Drapala |
| 2016/0188471 A1 | 6/2016 | Forrest et al. |
| 2016/0210231 A1 | 7/2016 | Huang et al. |
| 2016/0216912 A1* | 7/2016 | Muralimanohar ....... G11C 8/12 |
| 2016/0283375 A1 | 9/2016 | Das Sharma |
| 2017/0024320 A1 | 1/2017 | Forrest et al. |
| 2017/0091101 A1 | 3/2017 | Lin et al. |
| 2017/0168939 A1 | 6/2017 | Jalal et al. |
| 2017/0185515 A1 | 6/2017 | Fahim et al. |

* cited by examiner

DATA PROCESSING APPARATUS WITH SNOOP REQUEST ADDRESS ALIGNMENT AND SNOOP RESPONSE TIME ALIGNMENT

BACKGROUND

Data processing systems, such as a System-on-a-Chip (SoC) may contain multiple processor cores, multiple data caches and shared data resources. In a shared memory system for example, each of the processor cores may read and write to a single shared address space. Cache coherency is an issue in any system that contains one or more caches and more than one device sharing data in a single cached area. There are two potential problems with a system that contains caches. First, memory may be updated by another device after a cached device has taken a copy. At this point, the data within the cache is out-of-date or invalid and no longer contains the most up-to-date data. Second, systems that contain write-back caches must deal with the case where the device writes to the local cached copy at which point the memory no longer contains the most up-to-date data. A second device reading memory will see out-of-date data.

The data processing system may be arranged as a number of nodes coupled together via an interconnect system to form a network. One example of a protocol for maintaining cache coherency uses snoop requests. When a node of a network wishes to access data associated with a particular address, a snoop message is sent to other nodes that have a copy of requested data stored in a local cache.

However, the connected nodes may have different data bus widths. The presence of nodes having different data bus widths can result in timing and bus utilization inefficiencies.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
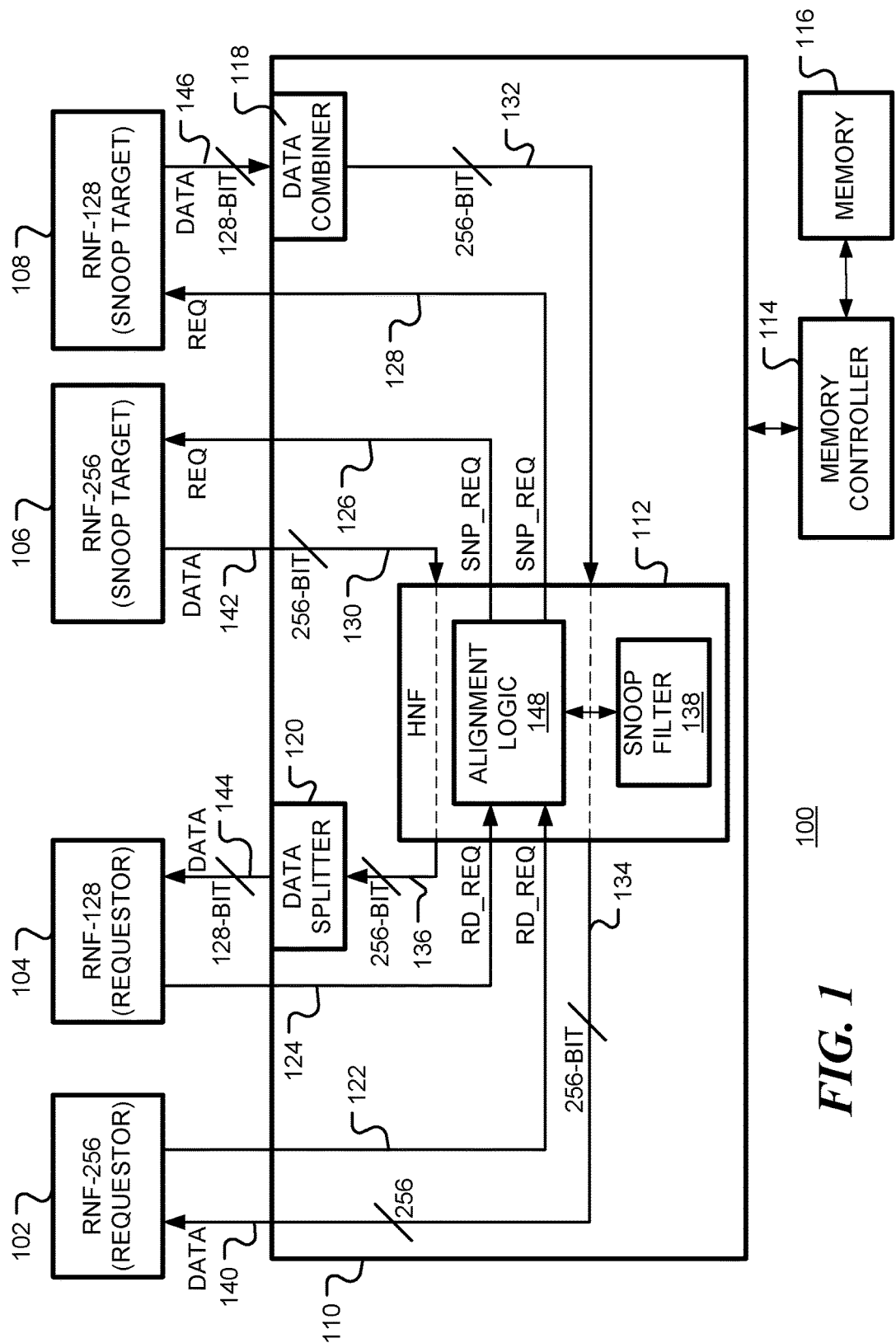
FIG. 1 is a block diagram of a data processing apparatus, in accordance with various representative embodiments.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

As utilized herein, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term "coupled" is also understood generically to mean indirectly connected, for example, in an appropriate context.

The various embodiments and examples of the present disclosure as presented herein are understood to be illustrative of the present disclosure and not restrictive thereof and are non-limiting with respect to the scope of the present disclosure.

Further particular and preferred aspects of the present disclosure are set out in the accompanying independent and dependent claims. Features of the dependent claims may be combined with features of the independent claims as appropriate, and in combinations other than those explicitly set out in the claims.

The present disclosure is directed towards achieving an efficient trade-off between signal latency and data bus utilization in a data processing apparatus, such as a System-on-a-Chip (SoC).

A data processing apparatus may use multiple processor devices inside a chip to scale up performance and reduce latency. A program or task can be broken down into independent steps that can be executed in parallel by multiple devices. When the devices need to share data or control information, they communicate with one another through an on-chip interconnect.

Shared data is often stored off-chip in a main memory (such as DRAM) which is slow to access and consumes a lot of power. Efficiency is improved by using local L2 caches in each processor device that are accessible by other on-chip processor devices. This speeds up the inter-processor communication and reduces power consumption.

However, a mechanism is needed to ensure that any processor gets the latest data, rather than out-of-date or stale data. One approach is to use one or more home nodes in the interconnect to keep track of cache contents and manage memory access requests. A home node is a data handling module that can be considered to be within the interconnect or attached to it. Each home node manages requests for a region of the shared memory. A processing device sends data requests to the appropriate home node, and the home node manages how the request is processed. The processing device is referred to as a requestor node. The home node may serialize requests from all requestor nodes and execute them in serial order so as to maintain data coherency.

The memory space is divided between home nodes and is further divided into units called cache lines. For example, a cache line may contain 32, 64, or 128 bytes of data depending upon the design of the system. Coherency is managed at this level, so data is stored as cache lines in the local caches of processing devices and, when data is requested from a home node, a complete cache line is returned, containing the data associated with the requested address.

When a requestor node wants to access data in a cache line, it sends a request to the home node of the interconnect that is associated with that address. The home node maintains a record, in the form of a snoop filter, for example, of which nodes have a copy of the cache line in a local cache and sends a message, called a snoop request, to the identified node or nodes (the target nodes) requesting the data. Data not stored in local cache may be retrieved from the main memory via a memory controller, for example.

Data is transferred through the interconnect on data buses of a certain width. In addition, each node has a data bus of a certain width. These data bus widths may not be the same. In addition, the bus widths are usually not wide enough to transfer a complete cache line in a single parallel transfer. The cache line must then be split into multiple sections, called 'beats' and sent serially. For example, a 64 byte cache line (512 bits) could be sent as four 128-bit beats on a 128-bit data bus, or as two 256-bit beats on a 256-bit data bus. This serialization of the data transfer introduces a delay or latency into the system. Further, when the bus widths are not all the same, bus utilization depends upon how data is split and combined.

In accordance with embodiments of the disclosure, a home node of a data processing apparatus that includes a number of devices coupled via an interconnect is configured to provide efficient transfer of data to a first device from a second device. The home node is configured dependent upon data bus widths of the first and second devices and dependent upon the data bus width of the interconnect. Data is transferred as a cache line serialized into a number of data beats. The home node may be configured to minimize the number of data transfers on the third data bus or to minimize latency in the transfer of the critical beat of the cache line.

FIG. 1 is a block diagram of a data processing apparatus 100, in accordance with various embodiments. Data processing systems, such as a System-on-a-Chip (SoC), may contain multiple processing devices, multiple data caches, and shared data resources. The system 100 may be implemented in a System-on-a-Chip (SoC) integrated circuit, for example. In the simplified example shown, the system 100 is arranged as a network with a number of nodes connected together via an interconnect system. The nodes are functional blocks or devices, such as processors, I/O devices or memory controllers, for example. As shown, the nodes include devices 102, 104, 106 and 108. The devices are coupled via an interconnect system 110. Other devices, such as input/output devices and timers, have been omitted in FIG. 1 for the sake of clarity. A device such as 102, 104, 106 or 108, may be, for example, a processing core, a cluster of processing cores, a graphics post processor (GPP), a digital signal processor (DSP), a field programmable gate array (FPGA) or an application specific integrated circuit (ASIC) device.

The devices may be coupled, via interconnect system 110 and one or more home nodes 112 (HNs) to each other and to data resources such as memory controller 114 for accessing shared memory 116. Devices 102, 104, 106 and 108 are able to generate data access requests and are referred herein as requestor nodes (RNs). When multiple nodes share a data or memory resource, a coherent protocol may be used, and devices may be referred to as fully coherent (e.g. RNF and HNF). Other devices may provide connections to another integrated circuit. Note that many elements of a SoC, such as clocks, have been omitted from FIG. 1 for the sake of clarity.

Nodes that generate requests for data transactions, such as 'load' and 'store', for example, are referred to a requestor node and are end points for such transactions. Nodes that respond to the requests are referred to as target nodes. For example, in FIG. 1, devices 102 and 104 are requestor nodes and devices 106 and 108 are target nodes. When data requested by requestor nodes 102 and 104 is present at target node 106 or 108, it is passed back to the requestor node via interconnect system 110.

In a data transaction, the requestor node creates a message, comprising one or more packets, and injects it into the interconnect for transmission to its destination. A packet can contain a memory address, data from memory, or both, and may also hold control or routing bits. A control packet, such as a data read request, may contain only address information and control bits. In an on-chip network, a 'packet' is the meaningful unit of the upper-layer protocol, such as the cache-coherence protocol.

A packet may be broken into a number of flow-control digits or 'flits'. A packet can contain a head flit, a body flit, and tail flit. The head denotes the beginning of a packet, containing routing and control information, the body contains the payload of the packet, and the tail denotes when the entire packet has been received. While individual packets may follow different routes in a network, the component flits of a packet are transmitted in sequence over a common route. Thus, a "flit" is the smallest unit of flow control maintained by the network. Generally, a packet consists of one or more number of flits, so if the packet size is larger than one flit, then the packet is split into multiple flits.

A physical channel may contain a data bus, which consists of lines dedicated to data transfer, together with additional lines dedicated to control data and metadata. In one embodiment, the data is divided into a number of chunks and the metadata includes 'data-validity bits' that indicate whether a corresponding data chunk contains valid data or not. As discussed below, the ability to transfer data beats that contain both valid and invalid chunks enables data transfer latency to be reduced. Typically, a 'flit' will contain a data beat in addition to other information that is transmitted in parallel. For example, the additional information may be validity bits that indicate which parts for data beat are valid and which are invalid. Herein, the action of sending a data beat and sending a flit are considered to be synonymous.

In a cache, data is typically stored as lines of data, for example 64 bytes of data, together with an address tag or line address. For an N-bit address and cache lines of 64 bytes, bits [N−1:6] of the address may be used as the cache line tag or address. The lower six bits of the address (bits [5:0]) denote the offset or position of the data within the cache line. Other length cache lines may be used.

In response to a data read request, a complete cache line is returned. Unless the data bus is the same width as a cache line, the data is sent as a number of data beats. For example, a 128-bit bus can sent 16 bytes at a time, so a 64 byte line is sent as four beats. Beat 0 contains data bytes with indices 15→0 (hexadecimal indices 0x00 to 0x0f), beat 1 contains data bytes with indices 31→16 (hexadecimal indices 0x10 to 0x10, beat 2 contains data bytes with indices 47→32 (hexadecimal indices 0x20 to 0x2f), and beat 3 contains data bytes with indices 63→48 (hexadecimal indices 0x30 to 0x3f). Thus, bits [5:4] of the requested data address indicate which beat contains the requested data bytes.

The time it takes for a flit or message to traverse the interconnect, from the time of injection to the time it is processed at its destination is referred to as latency. The total latency has three major components:

Propagation latency: the time it takes for a bit to traverse the interconnect.

Queuing latency: the time a packet waits in buffers/queues within the interconnect.

Serialization latency: when a packet size is larger than the channel width, the packet is broken into multiple pieces or beats, resulting in additional time for a total packet traversal. For example, if a packet is 256 bits, and the channel is 64 bits-per-cycle wide, the serialization is 4 cycles.

In order to reduce serialization latency, nodes are configured to send the beat containing the requested data bytes first, when responding to a request. The remaining beats may then be sent in 'wrap' order to facilitate circular addressing.

Referring again to FIG. 1, Interconnect system 110 may be used to connect devices having different bus widths by the inclusion of data combiner module 118 and data splitter module 120. Multiple combiner and/or splitter modules may be used. Data combiner module 118 and data splitter module 120 act as bridges, examples of which are described in co-owned patent application Ser. No. 14/965,237.

Data combiner module 118 can combine multiple incoming flits containing narrow beats (say 128-bit) into a single flit containing a wider beat (say 256-bit) provided that all narrow beats are contiguous in time, do not cross the wider beat boundary, and arrive in a given time window. If incoming (narrower) beats do not arrive in correct order as required by the data combiner, the outgoing (wider) data bus will carry partially-formed data beats thereby resulting in sub-optimal data bus utilization.

Figure 2:
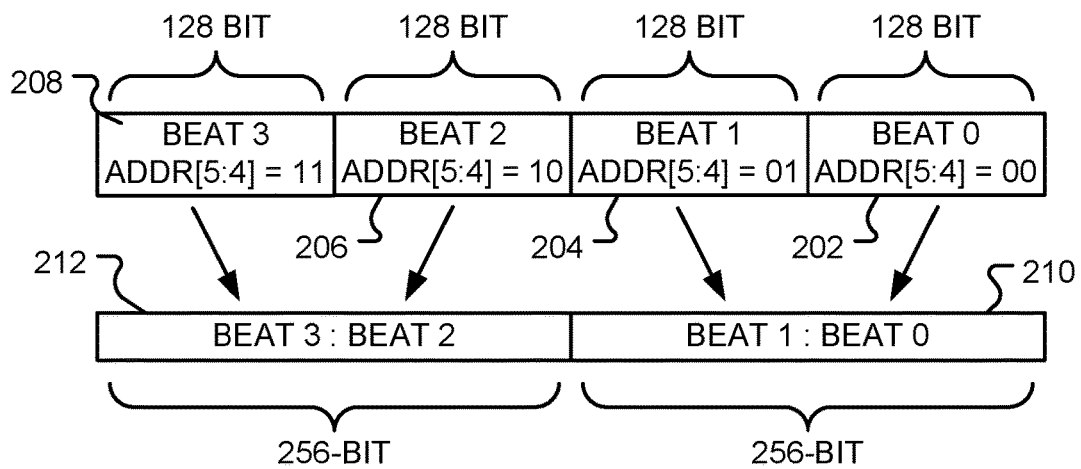
FIG. 2 is a diagrammatic representation of a sequence of data beats corresponding to a cache line in a data processing apparatus.

FIG. 2 is a diagrammatic representation of a sequence of beats corresponding to a cache line, for example. A sequence of narrower (128-bit) beats, 202, 204, 206 and 208, is shown in the upper sequence and a sequence of wider (256-bit) beats, 210 and 212, is shown in the lower sequence. In this example, narrower beats 2 and 3 (208 and 206) can be combined together into wider beat 212 and narrower beats 0 and 1 (202 and 204) can be combined together in wider bear 210. However, beats 1 and 2 cannot be combined since they span the boundary between 256-bit beats 210 and 212.

In a similar manner, wider beat 210 may be split into narrower beats 202 and 204 by a splitter module and wider beat 212 may be split into narrower beats 206 and 208.

An interconnect system may contain Requestor Nodes (RNFs) with different data bus widths. For example, in FIG. 1, requestor node 102 utilizes a 256-bit data bus and is denoted as 'RNF-256' while requestor node 104 uses a 128-bit data bus and is denoted as 'RNF-128'. Interconnect system 110 utilizes a 256-bit bus. These data bus sizes are provided by way of example and other data bus sizes may be used. For example, a data bus width may be 32-bits, 64-bits, 128-bits or 256-bits. In addition, widths that are not powers of two may be used. Although the example shown in FIG. 1 uses only two different bus widths, the interconnect may couple between more than two different bus widths. Requestor node 108 sends data to the interconnect via data combiner module 118, and requestor node 104 receives data from the interconnect via data splitter module 120.

Cache coherency is an issue in any system that contains one or more caches and more than one device sharing data in a single data resource. There are two potential problems with a system that contains caches. Firstly, memory may be updated by another device after a cached device has taken a copy. At this point, the data within the cache is out-of-date or invalid and no longer contains the most up-to-date data. Secondly, systems that contain write-back caches must deal with the case where the device updates the local cached copy, at which point the memory no longer contains the most up-to-date data. A second device reading memory will see out-of-date (stale) data. Cache coherency may be maintained through the exchange of 'snoop' messages between the processing devices, such as nodes 102, 104, 106 and 108, for example.

To maintain coherence, each processing device includes a snoop control unit that issues and receives coherence requests and responses, snoop messages, via the interconnect system 110 from other devices.

Snoop requests and responses are managed by home node 112. Home node 112 receives a data read request on interconnect bus 122 or 124, generates corresponding snoop messages on snoop buses 126 and 128, receives data on interconnect buses 130 and/or 132, and returns the data to the requestor node on buses 134 and/or 136. Data not found in any local caches of the target node may be retrieved from other locations, such as a memory via memory controller 114.

In some embodiments, snoop filter 138 is used to reduce the number of snoop messages by tracking which local caches have copies of data and filtering out snoop messages to other local caches.

In the example system shown in FIG. 1, nodes 102 and 106 each have a 256-bit data bus (140 and 142, respectively), while nodes 104 and 108 each have a 128-bit data bus (144 and 146, respectively) and the interconnect system 110 has 256-bit data buses (130, 132, 134 and 136). Other combinations of bus sizes may be used without departing from the present disclosure.

In the example discussed below with reference to FIG. 3, interconnect system 110 has 256-bit bus widths, the requestor bus width is 256 bits, and the target bus width is 128 bits. This corresponds, for example, to a coherent read transaction initiated by requestor 102 and targeted to node 108 in FIG. 1.

Figure 3:
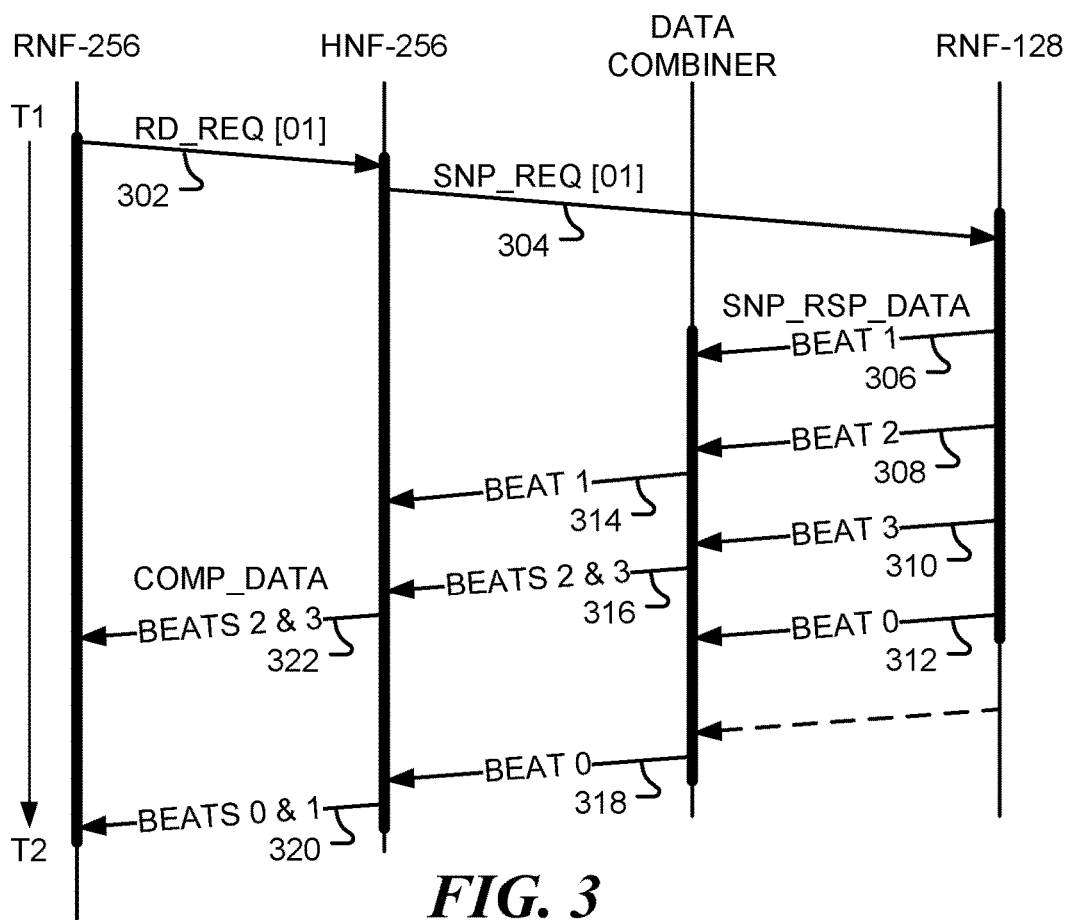
FIG. 3 is an example transaction flow diagram for a data transaction in a data processing apparatus.

FIG. 3 is a flow diagram of an example transaction in a system that has not been optimized. In the transaction, a read request 302 (denoted as RD_REQ [01]) is sent at time T1 from requestor node RNF-256 to Home Node HNF-256 in the interconnect system. The request includes a data address (ADDR) with some parts of address (ADDR[5:4], for example, as discussed above) denoting the beat (the serialized portion of the cache line) that will contain the requested data. This beat is referred to as the 'critical' beat. In this example, ADDR[5]=0 and ADDR[4]=1, which is denoted herein as ADDR[5:4]=2'b01. Thus, in FIG. 3, RD_REQ [01] denotes a request for data in beat 1.

If the home node determines that node RNF-128 has a copy of the requested data, the ADDR is passed as a snoop request (SNP_REQ [01]) 304 towards snoop target RNF-128 without any changes. The response data (SNP_RSP_DATA) is sent as four beats (306, 308, 310 and 312) to the data combiner. A snoop target sends the response data in wrap order, starting with the critical beat first. In this example, the critical beat information is in beat 1 (306), so this beat is sent first followed by the other beats (308, 310, 312) in wrap or cyclic order. If the critical beat happens to be misaligned to wider data bus (e.g. 256 bits) width, the data combiner module will not be able to combine multiple narrow beats into a single wide beat efficiently, thereby resulting in sub-optimal data bus utilization. In the example shown, the data combiner receives beat 1 (306) and waits to see if it can be combined with the next beat. The next beat is beat 2 (308) which cannot be combined, so beat 1 is sent in first flit 314. First flit 314 thus contains a single narrower beat. Beat 3 (310) arrives next and may be combined with beat 2 (308). Thus, second flit 316 contains two narrower beats. Beat 0 (312) arrives last. Since no additional beats are received within a designated time window, third flit 318 is sent containing the single remaining beat.

The home node (HNF-256) performs the final combination of data and it will wait for all sub-beats to arrive before combining them to form the critical beat. As a result, the critical beat (beat 1) is delivered to requestor in flit 320 at time T2, which is later than the delivery of the non-critical beats in flit 322. The transaction latency is the time from T1 until T2.

There are two issues with above transaction flow:
a. Critical beat (beat1) arrives at the requestor node later than non-critical beats, even though the snoop target delivered the critical beat first (306), and
b. Three 256-bit data beats (314, 316 and 318) are used to transport four narrower beats (of 128 bits each) between the Data Combiner module and the home node HNF-256, whereas two data beats would be sufficient.

In accordance with a first embodiment of the disclosure, a HNF in an interconnect system is configured to detect the data bus widths of a requestor, a snoop target, and the interconnect system and, based on various data bus widths combination, determine whether and how to align the incoming requested address before sending the address towards snoop target.

Figure 4:
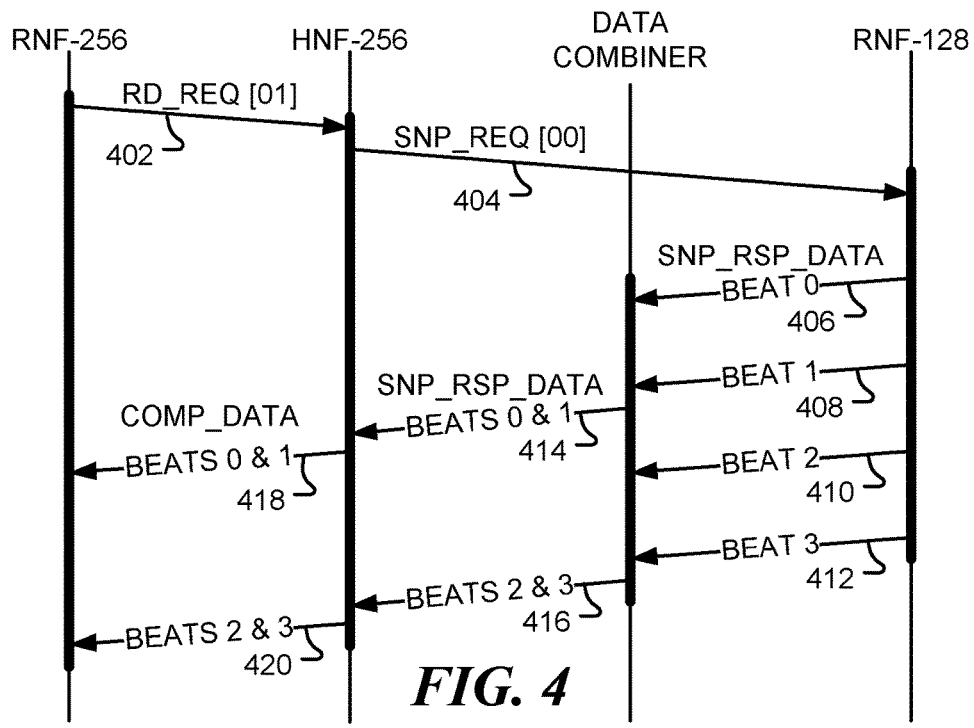
FIGS. 4-6 are transaction flow diagrams for data transactions in a data processing apparatus, in accordance with embodiments of the disclosure.

FIG. 4 shows a transaction flow diagram of a data processing apparatus in accordance with an embodiment of the disclosure. In this embodiment, a read request 402 (denoted as RD_REQ [01]) is sent at time T1 from requestor node RNF-256 to Home Node HNF-256 in the interconnect system. As before, the request includes an data address (ADDR) with some parts of address (ADDR[5:4], for example) denoting critical beat information. In this example, ADDR[5]=0 and ADDR[4]=1, so the requested data is located in beat 1.

The home node HNF-256 determines that snoop target bus (128-bit) is narrower than the Requestor/Interconnect data-bus widths (256-bit), so the home nodes HNF-256 aligns the snoop address to a 256-bit boundary and sends snoop request 404 (SNP_REQ [00]). Thus, the snoop address is the requested address except that ADDR[4] is set to zero to align the address to a 256-bit boundary. Thus the snoop request indicates a request for data in the same cache line, but located in beat 0, rather than beat 1. The snoop target RNF-128, thinking beat 0 is the critical beat, responds with data beats 406, 408, 410 and 412, in contiguous and naturally aligned order. This enables the data combiner to efficiently combine narrow beats into fully-populated flits 414 and 416 when transferring data towards the home node HNF-256. The actual critical beat data (beat 1) is first to reach requestor node in flit 418. The remaining data arrives in flit 420. This scheme minimizes the critical beat latency while maximizing data-bus efficiency, since only two flits (414 and 416) are sent from the home node HNF-256 to the requestor RNF-256.

Snoop address alignment, as described above, solves two issues:

1) The critical beat (beat1) arrives at the requestor first, while non-critical beats arrive later (beat2/beat3). Therefore, the critical beat does not get exposed to any non-critical beat latency.

2) Between the data combiner module and HNF-256, only two 256-bits data beats (414 and 416) are used to transport four beats of 128 bits each, thereby optimizing data bus utilization.

However, there are other scenarios where alignment of a snoop address will result in the best utilization of the data bus, but it may not be ideal for minimizing critical beat latency.

Figure 5:
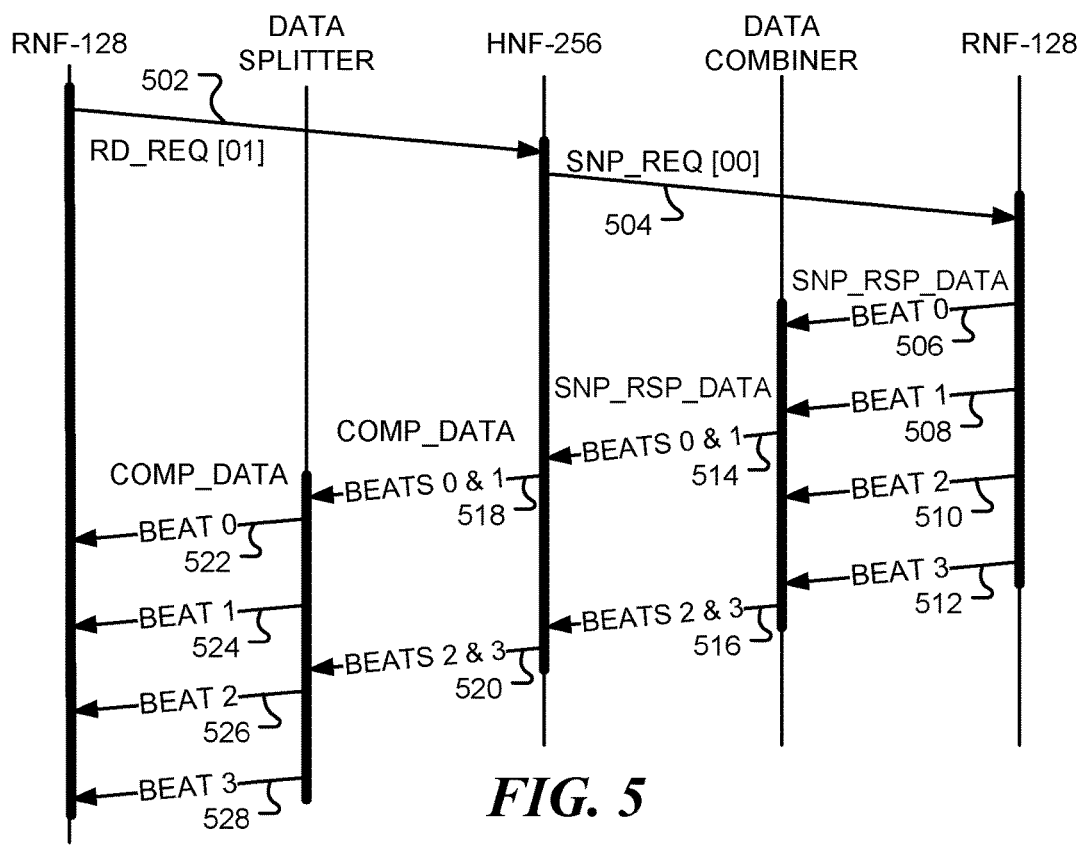

FIG. 5 shows a transaction flow diagram of a data processing apparatus in accordance with an embodiment of the disclosure. As indicated in FIG. 5, requestor RNF-128 on the left of the diagram and Snoop Target RNF-128 on the right of the diagram both have data-bus widths of 128 bits, while the interconnect system and the home node has a data-bus width of 256 bits. Read request 502 for data in beat 1 is received by the home node HNF-256. The home node HNF-256, based on various data widths, is configured to align the address in snoop request 504 to 256 bits, as indicated by SNP_REQ [00] so as to achieve the best utilization of the data bus. Data bus utilization is optimized since the four beats of 128 bit data (506, 508, 510, 512) are transported using only two 256-bit data beats (514 and 516, then 518 and 520) in the interconnect system. The 256-bit beats are separated in the data splitter into split four 128-bit beats (522, 524, 526, 528) in natural order. However, latency is not minimized since the critical beat 524 (beat 1) arrives at requestor later than beat 0 (522).

In the transaction shown in FIG. 5, data bus utilization is optimized but critical beat latency is not optimized. If it is determined that critical beat latency is more important in this system, the home node HNF-256 can choose to not align the snoop address when sending a request to snoop target. Additionally, when the critical beat arrives at the home node, the home node may be configured to send partially formed critical beats directly to requestor, without waiting on wider beat being fully populated. This will result in the best critical beat latency, as shown in FIG. 6.

Figure 6:
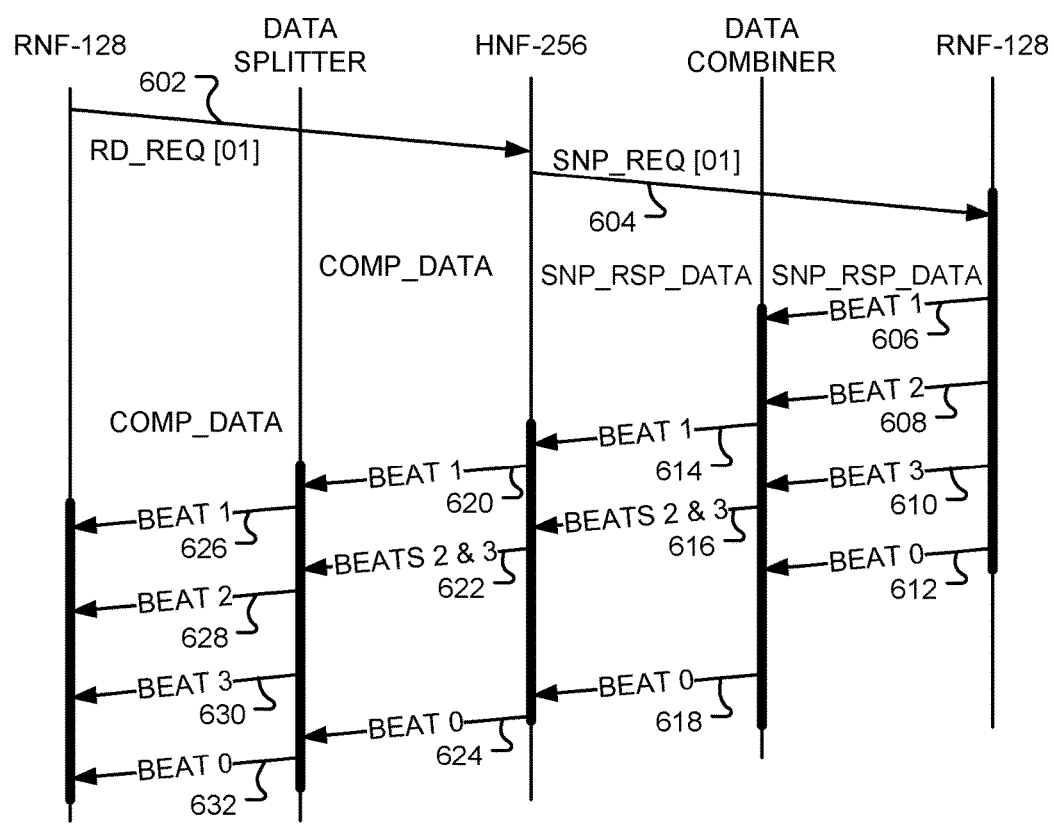

FIG. 6 shows a transaction flow diagram of a data processing apparatus in accordance with an embodiment of the disclosure. As indicated in FIG. 6, requestor RNF-128 on the left of the diagram and Snoop Target RNF-128 on the right of the diagram both have a data-bus width of 128 bits, while the interconnect system has a data-bus width of 256 bits. Read request 602 (RD_REQ [01]) for data in beat 1 is received by the Home node HNF-257. The home node HNF-256 is configured to minimize the critical beat latency, so the address in snoop request 604 is sent unchanged, as indicated by the notation SNP_REQ [01]. The snoop target RNF-128 responds with four beats of 128 bit data (606, 608, 610, 612), which are sent in wrap order with the critical beat first. The data combiner sends partially filled flit 614 when beat 608 arrives and cannot be combined. Beats 608 and 610 are combined into flit 616 and beat 612 is sent in flit 618 when no further flits are received by the data combiner within a designed time window.

HNF-256 is configured for minimum latency, so as soon as flit 614 is received containing critical beat 1, flit 620 is generated, even though the data beat is not completely filled. Signaling bits, such as data validity bits, are used to indicate to a recipient that the data beat is partially filled and which part of the data should be ignored. Flit 622 is generated when flit 616 is received and flit 624 is generated when flit 618 is received.

As before, the 256-bit beats are separated in the data splitter into split four 128-bit beats (626, 628, 630 and 632) in wrap order with the critical beat being sent first. In this way latency is minimized, since the critical beat 626 (beat 1) arrives at requestor first. However, bus utilization is not optimized since three flits (614, 616 and 618 or 620, 622 and 624) are used for transport in the interconnect.

The approaches described above enable a user or designer to configure an interconnect system for optimal latency or for optimal bus utilization. In some cases these may be achieved together. In one embodiment, the configuration may be performed dynamically using software controlled configuration registers, for example.

Figure 7:
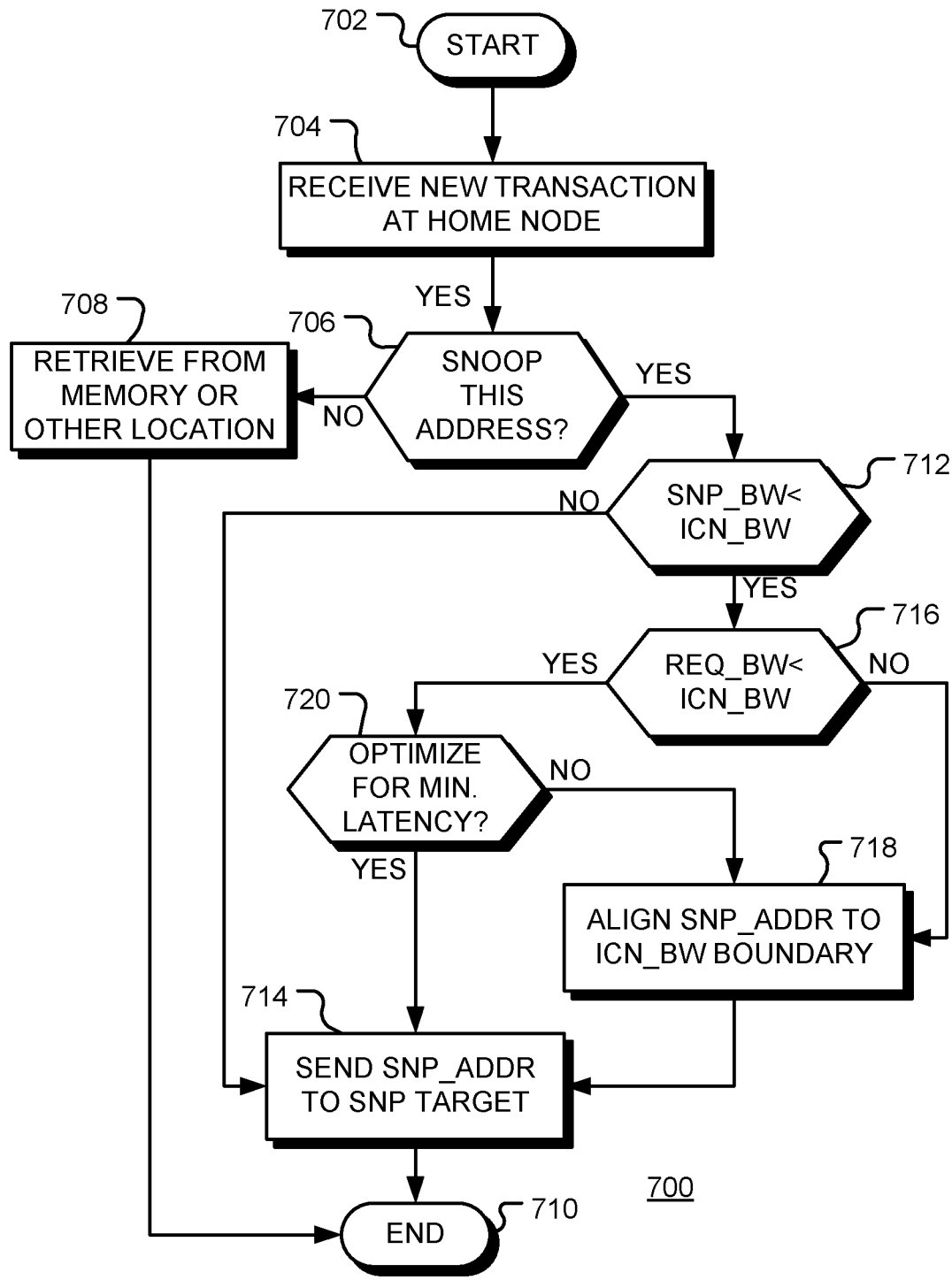
FIG. 7 is a flow chart of a method of processing a data read request, in accordance with various representative embodiments.

FIG. 7 is a flow chart 700 of a method of processing a data read request, in accordance with various representative embodiments. Following start block 702, a request to read data associated with an address is received, at block 704, at a home node of an interconnect from a requestor node. At decision block 706, the home node determines if the address is to be snooped. For example, a snoop filter may be checked to see if data associated with the address is present in a local cache of any other node coupled to the interconnect. If data from the address is not present in any local cache, the address is not snooped, as depicted by the negative branch from decision block 706. Instead, the data associated with the address may be retrieved at block 708 from a shared memory via a memory controller, for example, an I/O device or other location at block 708 and the method ends at block 710. If the address is to be snooped, as depicted by the positive branch from decision block 706, flow continues to decision block 712. If the bus width (SNP_BW) of the target node to be snooped is not less than the bus width (ICN_BW) of the interconnect, as depicted by the negative branch from decision block 712, the address to be snooped is sent unchanged to the snoop target, or targets, at block 714. If the bus width (SNP_BW) of the target node to be snooped is less than the bus width (ICN_BW) of the interconnect, as depicted by the positive branch from decision block 712, flow continues to decision block 716. If the bus width (REQ_BW) of the requestor node is not less than the bus width (ICN_BW) of the interconnect, as depicted by the negative branch from decision block 716, the address to be snooped is aligned to the interconnect bus boundary at block 718 and the aligned snoop address is sent to the snoop target, or targets, at block 714. If the bus width (REQ_BW) of the requestor node is less than the bus width (ICN_BW) of the interconnect, as depicted by the positive branch from decision block 716, the action is dependent upon whether the system is optimized for minimum latency or optimal bus utilization. If the system is optimized for minimum latency, as depicted by the positive branch from decision block 720, the snoop address is sent, at block 714, to the snoop target without modification. Otherwise, as depicted by the negative branch from decision block 720, the address to be snooped is aligned to the interconnect bus boundary at block 718 and the aligned snoop address is sent to the snoop target, or targets, at block 714. The method terminates at block 710.

Figure 8:
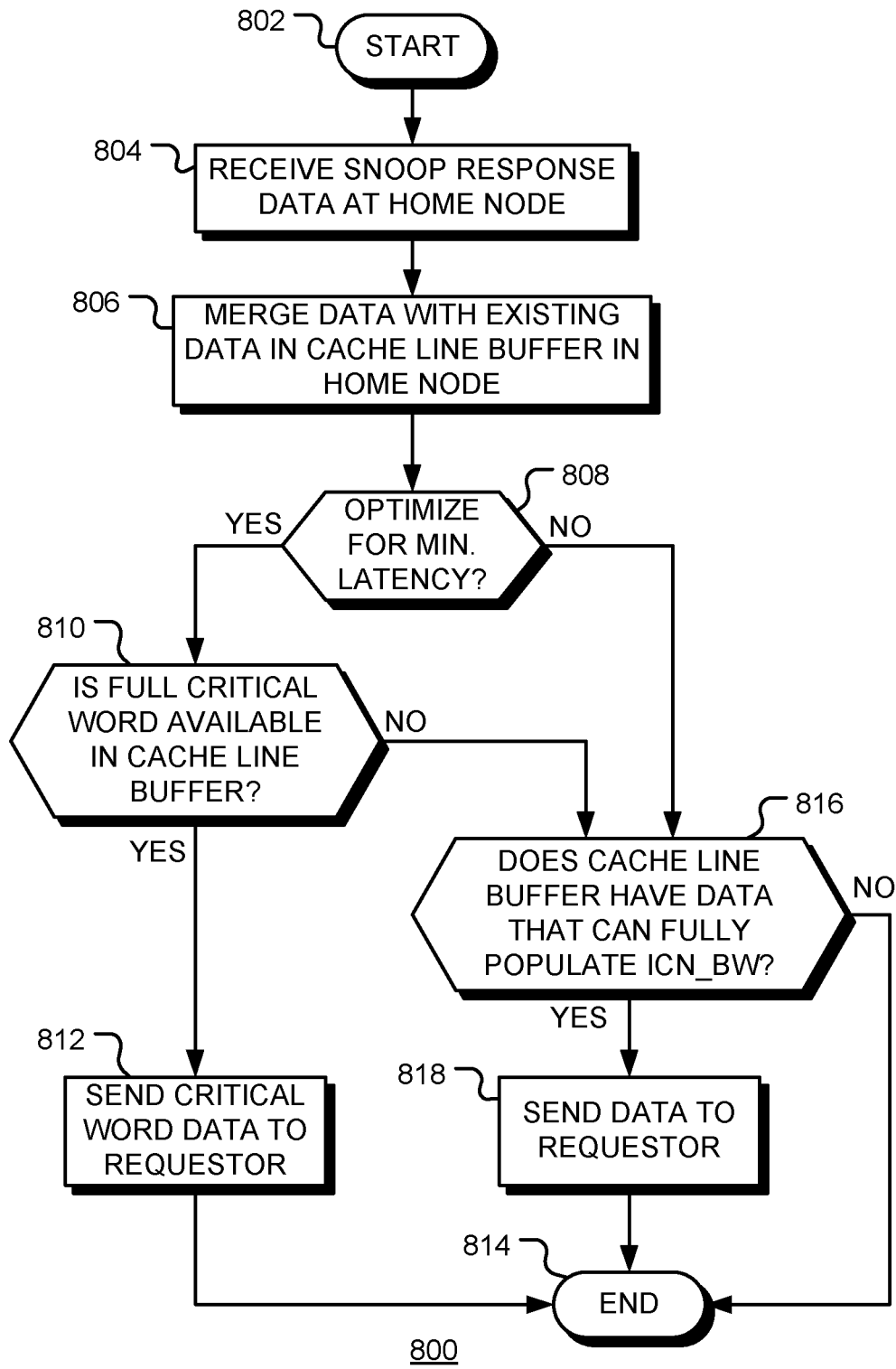
FIG. 8 is a flow chart of a method of processing a data read response, in accordance with various representative embodiments.

FIG. 8 is a flow chart 800 of a method for processing a data read response in accordance with various representative embodiments. Following start block 802, snoop response data is received at a home node of an interconnect system at block 804. The response comprises a sequence of one or more beats, where each beat is a portion of a cache line containing data requested by a requestor node. At block 806, the received data is merged with any existing data in a cache line buffer in the home node. The system may be optimized for minimum latency or optimal bus utilization. If the system is optimized for minimum latency, as depicted by the positive branch from decision block 808, a check is made at decision block 810 to determine if the full critical word (the word containing the critical data) is available in the cache line buffer. If the full critical word is available, as depicted by the positive branch from decision block 810, the critical word data is forwarded to the requestor node, at block 812, and the process terminates at block 814—even if the outgoing beat is not completely filled. Unused data chunks may be marked as 'invalid' using associated validity-bits in the metadata. This eliminates the latency that would be introduced if the home node waited for an outgoing beat to be completely filled before forwarding it to the requestor node.

If the full critical word is not available in the cache line buffer in the home node, as depicted by the negative branch from decision block 810, or if the system is not optimized for minimum latency, as depicted by the negative branch from decision block 808, flow continues to decision block 816. If the cache line buffer has sufficient data available to fully populate the interconnect bus width, as depicted by the positive branch from decision block 816, the buffered data is forwarded to the requestor node at block 818. If the cache line buffer does not contain sufficient data to fill an outgoing beat, as depicted by the negative branch from decision block 816, no action is taken until additional snoop data is received and the method ends at termination block 814.

Thus, in accordance with various embodiments of the disclosure, a home node (HNF) is configured to respond to the data request dependent upon the following configuration parameters:

1) The data bus width of requestor node (REQ_BW)
2) The data bus width of snoop target(s) (SNP_BW)
3) The data bus width of interconnect system (ICN_BW), and
4) The relative importance of critical beat latency (CB_Lat) versus data bus utilization (DataBus_Util)

Based upon the above information, the home node determines if, and how, to align the address in the snoop request and whether to send partial critical data beat to requestor. The actions of the home node are summarized in Table 1 below.

TABLE 1

| | Configuration | | | Actions | |
|---|---|---|---|---|---|
| Config. Number | REQ_BW < ICN_BW? | SNP_BW < ICN_BW? | CB Lat more important than DataBus_Util? | Align Snoop Address? | HNF sends partial critical beat first? |
| 1 | 0 | 0 | 0 or 1 | No | No |
| 2 | 0 | 1 | 0 or 1 | Yes | No |
| 3 | 1 | 0 | 0 | No | No |
| 4 | 1 | 0 | 1 | No | Yes |
| 5 | 1 | 1 | 0 | Yes | No |
| 6 | 1 | 1 | 1 | No | Yes |

One benefit of the approach discussed above is improved data bus utilization. Table 2 summarizes the improvement in an example data processing apparatus having 1. Requestor bus width (REQ_BW)=256 bits.
2. Snoop target bus width (SNP_BW)=128 bits.
3. Interconnect bus width (ICN_BW)=256 bits.

TABLE 2

| Critical beat containing requested data (Addr[5:4]) | Number of data beats between Data Combiner and HNF if Snoop Address is not aligned | Number of data beats between Data Combiner and HNF if Snoop Addr. is aligned | Note |
|---|---|---|---|
| 00 | 2 | 2 | |
| 01 | 3 | 2 | Better combining |
| 10 | 2 | 2 | |
| 11 | 3 | 2 | Better combining |
| Total | 10 | 8 | |

Assuming equal distribution of address offsets within cache lines, there is 20% savings on Data Bus utilization. That is, 20% less snoop response data traffic on the interconnect data bus between the Data Combiner and home node (HNF).

Those skilled in the art will recognize that the present invention may be implemented using a programmed processor, reconfigurable hardware components, dedicated hardware components or combinations thereof. Similarly, general purpose computers, microprocessor based computers, micro-controllers, optical computers, analog computers, dedicated processors and/or dedicated hard wired logic may be used to construct alternative equivalent embodiments of the present invention.

Dedicated or reconfigurable hardware components may be described by instructions of a Hardware Description Language. These instructions may be stored on non-transient computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present invention. Such alternative storage devices should be considered equivalents.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A data processing apparatus comprising:
   a first device comprising a first data bus having a first bus width;
   a second device comprising:
      a cache operable to store data in one or more cache lines, the data in each cache line comprising one or more data beats; and
      a second data bus having a second bus width, the second data bus able to transmit a data in a cache line as a series of data beats; and
   an interconnect system comprising a home node and a third data bus having a third bus width, the interconnect system configured to transfer data between the first device and the second device;
   where the home node is configured to:
      receive a read request, from the first device, for data associated with a first address;

when a critical data beat containing the data associated with the first address is present in a cache line at the second device:
send a snoop message to the second device for data at a second address in the cache line; and
when the second bus width is less than the third bus width and either the first bus width is the same as the third bus width or the data processing apparatus is configured to minimize the time taken to transfer the critical data beat from the second device to the first device:
align the first address to a boundary of the third data bus to provide the second address;
otherwise:
provide the first address as the second address.

2. The data processing apparatus of claim 1, where when the second bus width is less than the third bus width, the second data bus and the third data bus are coupled together via a data combiner of the data processing apparatus.

3. The data processing apparatus of claim 1, where, responsive to the snoop message, the second device is configured to send, to the home node, a data beat containing data associated with the second data address first, followed by the remaining data beats of the cache line containing data associated with the second address.

4. The data processing apparatus of claim 1, where, when the first bus width is less than the third bus width and the data processing apparatus is configured to minimize the time taken to transfer the critical data beat from the second device to the first device, the home node is configured to forward a critical data beat, received from the second device, to the first device without waiting to determine if it can be combined with a subsequent data beat received from the second device.

5. The data processing apparatus of claim 1, where, when the data processing apparatus is configured to minimize the time taken to transfer the critical data beat from the second device to the first device, the home node is configured to forward a critical data beat, received from the second device, to the first device without waiting to determine if it can be combined with a subsequent data beat received from the second device.

6. The data processing apparatus of claim 1, where data transferred on the third bus is divided into a plurality of chunks and where the data is transferred together with a plurality of validity-bits, each validity-bit associated with a chunk of the plurality of chunks and being indicative of the validity of that chunk.

7. The data processing apparatus of claim 1, where, when the first bus width is less than the third bus width, the first data bus and the third data bus are coupled together via a data splitter of the data processing apparatus.

8. The data processing apparatus of claim 1, further comprising one or more third devices operable to send requests to the home node, each third device having a data bus width.

9. The data processing apparatus of claim 1, further comprising one or more fourth devices operable to receive snoop requests from the home node, each fourth device having a data bus width.

10. The data processing apparatus of claim 1, where the first bus width is selected from a group of bus-widths consisting of 32-bits, 64-bits, 128-bits and 256-bits.

11. The data processing apparatus of claim 1, where the second bus width is selected from a group of bus-widths consisting of 32-bits, 64-bits, 128-bits and 256-bits.

12. A System-on-a-Chip (SoC) comprising the data processing apparatus of claim 1.

13. A method of data transfer in a data processing apparatus, the method comprising:
receiving, by a home node of an interconnect system that couples at least a first device and a second device, a request from the first device to access data associated with a first address, where the data associated with the first address is present in a critical beat of a cache line stored in a local cache of the second device; and
sending a snoop message from the home node to the second device for data in the cache line associated with a second address,
where:
the first device comprises a first data bus having a first bus width;
the second device comprises a second data bus having a second bus width; and
the interconnect system comprises a third data bus having a third bus width,
the method further comprising:
aligning the first address to a boundary of the third data bus to provide the second address when the second bus width is less than the third bus width and either the first bus width is the same as the third bus width or the data processing apparatus is configured to minimize the time taken to transfer the critical data beat from the second device to the first device, and providing the first address as the second address otherwise.

14. The method of claim 13, where the second data bus and the third data bus are coupled via a data combiner, the method further comprising:
combining one or more data beats from the second data bus to provide data beats for the third data bus, when the second bus width is less than the third bus width.

15. The method of claim 13, where, responsive to the snoop message, the second device is configured to send, to the home node, a data beat containing data associated with the second data address first, followed by the remaining data beats of the cache line containing data associated with the second data address.

16. The method of claim 13, further comprising, when the first bus width is less than the third bus width and the data processing apparatus is configured to minimize the time taken to transfer the critical data beat from the second device to the first device:
forwarding, by the home node, a critical data beat, received from the second device, to the first device without waiting to determine if the critical data beat can be combined with a subsequent data beat received from the second device.

17. The method of claim 13, where the first data bus and the third data bus are coupled via a data splitter, the method further comprising:
splitting a data beat received from the third data bus to provide a plurality of narrower data beats for the first data bus when the first bus width is less than the third bus width; and
when a narrower beat of the plurality of narrower beats is a critical beat, sending the critical beat first, followed by remaining narrower beats.

18. A method of data transfer in a data processing apparatus, the method comprising:
receiving, by a home node of an interconnect system that couples at least a first device and a second device, a request from the first device to access data associated with a first address, where the data associated with the first address is present in a critical beat of a cache line stored in a local cache of the second device; and sending a snoop message from the home node to the second device for data in the cache line associated with a second address, where:

the first device comprises a first data bus having a first bus width;

the second device comprises a second data bus having a second bus width; and the interconnect system comprises a third data bus having a third bus width, the method further comprising:

receiving, by the home node, responsive to the snoop request, a sequence of data beats corresponding to the cache line associated with the second address, the sequence of data beats including the critical data beat; and when the first bus width is less than the third bus width and the data processing apparatus is configured to minimize the time taken to transfer the critical data beat from the second device to the first device:

forwarding, by the home node, the critical data beat, received from the second device, to the first device without waiting to determine if the critical data beat can be combined with a subsequent data beat of the sequence of data beats received from the second device.

19. The method of claim 18, further comprising:

aligning the first address to a boundary of the third data bus to provide the second address when the second bus width is less than the third bus width and either the first bus width is the same as the third bus width or the data processing apparatus is configured to minimize the time taken to transfer the critical data beat from the second device to the first device; otherwise, providing the first address as the second address.

20. A method of data transfer in a data processing apparatus, the method comprising:

receiving, by a home node of an interconnect system that couples at least first and second devices, a request from the first device to access data associated with a first address;

determining if data associated with a first address is present in a cache line stored in a local cache of the second device;

sending a snoop request from the home node to the second device for data associated with a second address in the cache line when data associated with the first address is present in the cache line stored in the local cache of the second device;

receiving, by the home node, a response to the snoop request, the response comprising a first sequence of data beats corresponding to the cache line; and forwarding the response to the first device as a second sequence of data beats;

where:

the first device comprises a first data bus having a first bus width;

the second device comprises a second data bus having a second bus width; and the interconnect system comprises a third data bus having a third bus width, the method further comprising:

determining the second address by aligning the first address to a boundary of the third data bus when the second bus width is less than the third bus width and either the first bus width is the same as the third bus width or the data processing apparatus is configured to minimize the time taken to transfer the critical data beat from the second device to the first device; otherwise, determining the second address to be the first address.

21. The method of claim 20, where, when the first bus width is less than the third bus width and the data processing apparatus is configured to minimize a time taken to transfer the critical data beat from the second device to the first device, forwarding the response to the first device as the second sequence of data beats comprises:

forwarding a critical data beat of the first sequence of data beats to the first device without waiting to determine if the critical data beat can be combined with a subsequent data beat of the first sequence of data beats.

22. A method of data transfer in a data processing apparatus, the method comprising:

receiving, by a home node of an interconnect system that couples at least a first device and a second device, a request from the first device to access data associated with a first address;

determining if data associated with a first address is present in a cache line stored in a local cache of the second device;

sending a snoop request from the home node to the second device for data in the cache line associated with a second address when data associated with the first address is present in the cache line stored in the local cache of the second device;

receiving, by the home node, a response to the snoop request, the response comprising a first sequence of data beats corresponding to the cache line; and forwarding the response to the first device as a second sequence of data beats;

where:

the first device comprises a first data bus having a first bus width;

the second device comprises a second data bus having a second bus width; and the interconnect system comprises a third data bus having a third bus width;

the method further comprising configuring operation of the home node dependent upon the first, second and third bus widths.

23. The method of claim 22, where operation of the home node is configured to minimize the number of data transfers on the third data bus.

24. The method of claim 22, where operation of the home node is configured to minimize a time between sending, from the first device, a request for data associated with the first address and receiving, by the first device, the data associated with the first address.

25. A data processing apparatus comprising:

a first device comprising a first data bus having a first bus width;

a second device comprising:

a cache operable to store data in one or more cache lines, the data in each cache line comprising one or more data beats; and a second data bus having a second bus width, the second data bus able to transmit a data in a cache line as a series of data beats; and an interconnect system comprising a home node and a third data bus having a third bus width, the interconnect system configured to transfer data between the first device and the second device;

where the home node comprises a cache line buffer and is configured to:

receive a request from the first device to access data associated with a first address;

determine if data associated with a first address is present in a cache line stored in a local cache of the second device;

send a snoop request to the second device for data in the cache line associated with a second address when data associated with the first address is present in the cache line stored in the local cache of the second device;

receive a data beat of the cache in response to the snoop request, where the data beat is data beat a sequence of data beats corresponding to the cache line;

merge the received data beat with any data existing in the cache line buffer;

when the data processing system is optimized for minimum latency and when all of the data associated with the first address is available in the cache line buffer send the data associated with the first address to the first device in a data beat on the third bus;

otherwise:

when the cache line buffer contains sufficient data to fully populate a data beat on the third data bus, send the data to the first device in a data beat on the third bus.

26. The data processing apparatus of claim 25, where a physical channel of the interconnect comprises the third data bus and a plurality of additional lines, where data on the third data bus comprises a plurality of data chunks and where the additional lines are configured to transfer validity-bits, each validity-bit associated with a data chunk of the plurality of data chunks and being indicative of the validity of the associated data chunk.

* * * * *